No. 762,761. PATENTED JUNE 14, 1904.
J. ROPER.
ATTACHMENT FOR MARINERS' COMPASSES.
APPLICATION FILED DEC. 19, 1903.
NO MODEL. 2 SHEETS—SHEET 1.
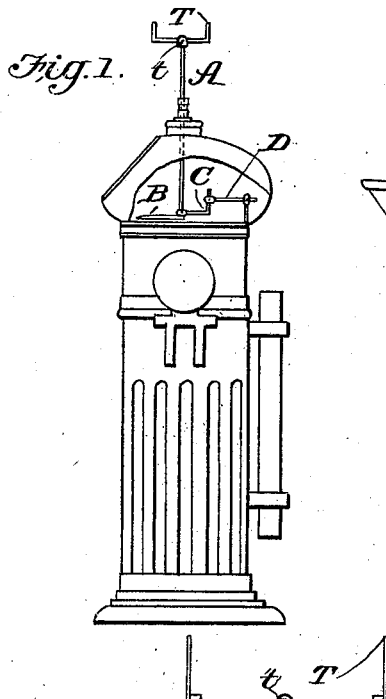
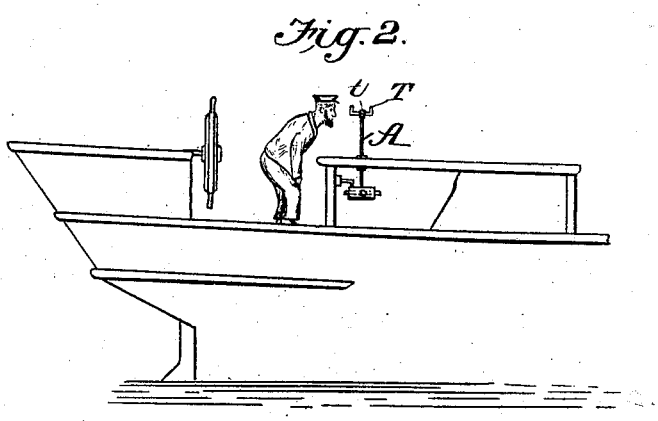
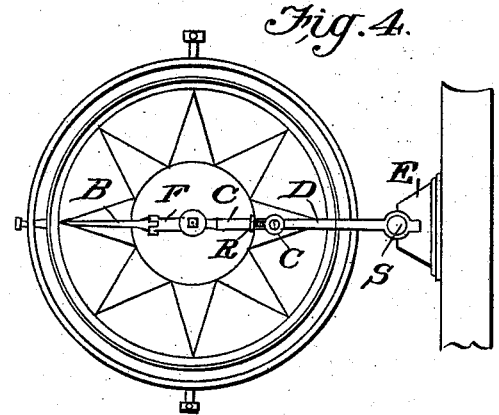
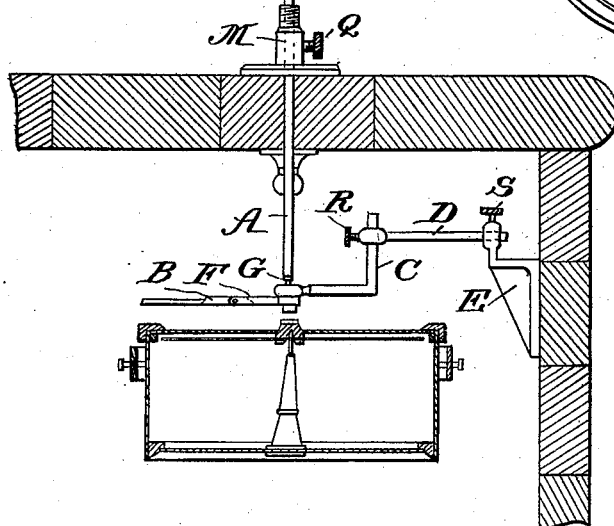
WITNESSES:
Phil E. Barnes
Edw. W. Byrn
INVENTOR
Joseph Roper.
BY Munn & Co.
ATTORNEYS No. 762,761. PATENTED JUNE 14, 1904.
J. ROPER.
ATTACHMENT FOR MARINERS' COMPASSES.
APPLICATION FILED DEC. 19, 1903.
NO MODEL. 2 SHEETS—SHEET 2.
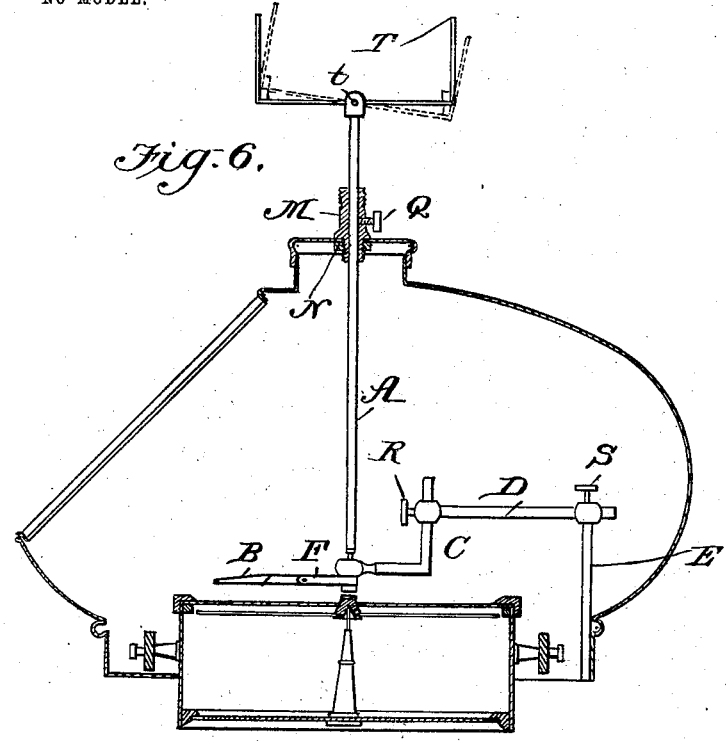
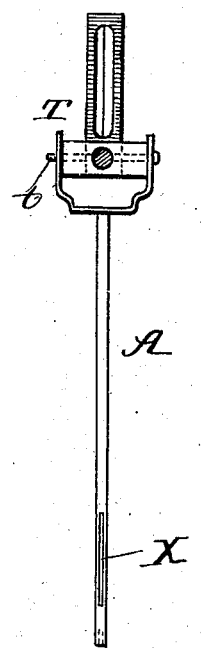
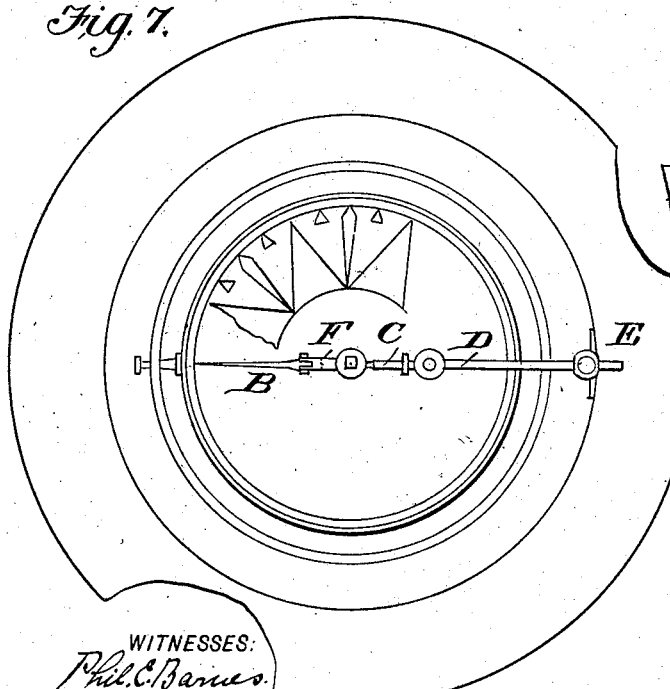
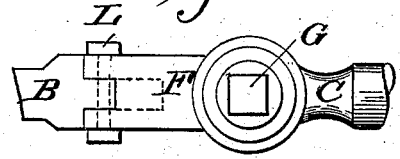
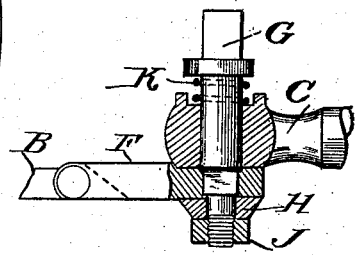
WITNESSES:
Phil. C. Barnes
Edw. W. Byrn
INVENTOR
Joseph Roper.
BY Munn & Co.
ATTORNEYS No. 762,761. Patented June 14, 1904.

UNITED STATES PATENT OFFICE.

JOSEPH ROPER, OF ST. JOHNS, NEWFOUNDLAND.

ATTACHMENT FOR MARINERS' COMPASSES.

SPECIFICATION forming part of Letters Patent No. 762,761, dated June 14, 1904.

Application filed December 19, 1903. Serial No. 185,909. (No model.)

*To all whom it may concern:*

Be it known that I, JOSEPH ROPER, a subject of the Crown of Great Britain, and a resident of St. Johns, in the Island of Newfoundland, have invented a certain new and useful Attachment for Mariners' Compasses; and I do hereby declare that the following is a full, clear, and exact description of the same.

My invention relates to a compass attachment for taking the bearings of the heavenly bodies, landmarks, lights, and distant objects, in which a vertical rod, bearing at its upper end a sighting device, operates in conjunction with an indicating-pointer on the face of the compass, so as to give the true and accurate bearing of any object when the compass is in such a position that bearings cannot be observed and noted on the compass at one and the same time—as, for example, when the compass is in the cabin-skylight or wheel-house, or when covered by a binnacle hood or cowl, or when a bearing is being taken at night. The objects of my improvement are to enable bearings to be taken accurately when the compass is in such positions as above stated, to enable accurate bearings to be taken at night, to enable the mariner to discover the deviation of his compass by taking fixed bearings and comparing with compass indication, to enable accurate bearings to be taken with the binnacle without removal of binnacle or interference in any way with its hood or top, to enable bearings to be taken off pole-compasses, and to discover by noting bearings of a fixed object from time to time how tide is setting. Devices for such purposes have heretofore been provided in which the sighting device was attached to a vertical rod bearing a pointer-arm on its lower end moving over the face of the compass.

My invention consists in an improved construction of such device, which will be hereinafter described, and pointed out in the claims.

Figure 1 represents the instrument fitted on the binnacle. Fig. 2 represents the instrument as fitted to the compass in the deck-house, wheel-house, skylight, or underdecks. Fig. 3 represents an enlarged longitudinal section of the instrument as shown in Fig. 2. Fig. 4 is a plan view of the same with the vertical rod and its upper attachments removed. Fig. 5 represents a sectional detail of a weather-cap to be screwed on bushing when the vertical rod is removed and the instrument is not in use. Fig. 6 represents an enlarged longitudinal section of the binnacle and compass as shown in Fig. 1 with my attachment applied. Fig. 7 is a plan view of the same with the vertical rod removed. Fig. 8 represents an elevation of the cross-head and attached vertical rod. Fig. 9 represents a sectional detail of the center pin and pointer, showing method of keeping the pointer steady. Fig. 10 represents a plan view of the center pin, showing also the method of hanging the pointer-tip to the pointer.

Similar letters refer to similar parts throughout the several views.

The instrument may be regarded as consisting of two specific parts, the first part consisting of a brass arm and indicator or pointer and the second of a vertical rod with cross-head.

All fittings and parts of the instrument must be made of brass or some other metal which will not influence the compass.

The description of the first part of the instrument is as follows: To the side of the skylight compass box or binnacle, by means of a bracket E, I attach an adjusting brass arm, which may be simply horizontal or a horizontal adjusting-arm D, in conjunction with a radial adjusting-arm C, having an elbow extension passing through arm D, as shown in Figs. 3 and 6. These arms are fixed in their adjustment by clamp-screws R and S. Said arms must be so adjusted that the mechanism described immediately hereinafter shall be exactly over the center of the compass, with the nut J at the end of it (see Fig. 9) almost touching the face of the compass. Through the end of this arm and immediately over the center of the compass is put a center pin G, so placed as to revolve freely and yet remain perpendicular in relation to the pointer F. At the apex of the center pin G is a square head upon which the vertical rod A is socketed when the instrument is in use. Immediately under the above-mentioned head is a collar, and between the collar and the upper side of the brass arm C is a spiral spring K. Near the bottom end of the center pin G is a square shank made small enough to go through a square hole in the end of the pointer-arm, upon which square shank the pointer F is socketed. Below this square shank of the pin is formed a screw of such a size as to pass through the square hole in the end of the pointer F. When the pointer F is placed in position, a washer H is placed on the screw under the pointer-arm, and then a nut J is screwed on to keep the pointer F tight and in position. The spiral spring K is for the purpose of keeping the pointer F in position should the nut J work loose. To the pointer F is hinged (see Figs. 9 and 10) a pointer-tip B, with an articulated joint that allows it to rise, but will not allow it to fall below the horizontal. This tip is hinged so that the pointer-tip can adapt itself to the motion of the ship.

The second part of this machine consists of a vertical rod A, of brass or copper, which may be solid or hollow. At the lower end of this rod is formed a socket to fit on the square head at the apex of the center pin G. A slot X (see Fig. 8) is made in this rod in such a position that the pointer and tip can be observed when the vertical rod is between them and the observer. At the apex of this vertical rod is placed the cross-head T, with a tilting joint $t$, so that the sight-line can be elevated or depressed, as shown in dotted lines in Fig. 6. This cross-head is fitted to the apex of the vertical rod A so that it is immediately over and in exact alinement with the pointer and tip over the face of the compass. This vertical rod is put down through the deck-house or binnacle-top, as the case may be, through an aperture immediately over the center of the compass. In this aperture is placed a bushing M, so as to allow the vertical rod to revolve freely and yet keep a vertical position with relation to the pointer. This bushing is kept in position by a bushing-nut N, screwed under the binnacle-top or under the deck-house, as the case may be. The vertical rod can be kept in any desired position by the clamping-screw Q. (Shown in Fig. 6.) When the instrument is not in use, the vertical rod and attachment are withdrawn, and the compass is protected by a weather-cap P, Fig. 5, which screws on the top of the bushing M.

The method of using my instrument is as follows: When about to use the instrument, unscrew the weather-cap P off the bushing M. Insert the vertical rod A through the bushing and drop it on the square head of the center pin G. Then find the object of which you wish to get the bearing by compass underneath and sight it with the center line of the cross-head by turning the rod A till you divide the object with the center line of the cross-head. The pointer F B will then indicate the bearing by the compass.

A bearing can be taken off a pole-compass by simply reversing the mechanism and taking the bearing of the object from bridge or deck of a vessel.

With regard to this instrument two strong features of utility are: First, it can be attached to any compass or binnacle without alteration in any way of the compass or binnacle. Second, by being able to take bearings off the binnacle without removal of its hood or top or opening the brass door or back of binnacle the compass is not exposed to the weather or accident, and if being used at night binnacle-lights cannot be blown out by wind.

Having thus described my invention, what I claim as new, and desire to secure by Letters Patent, is—

1. An attachment for ships' compasses, comprising a vertical shaft having a sighting device at the top, a spring-pressed center pin detachably connected to the lower end of the shaft, an index-hand attached to the center pin and means for supporting the parts, substantially as described.

2. The combination with a compass, of the index-hand B F, the elbow-arm C supporting the same, the horizontal arm D supporting the elbow-arm and a vertical shaft bearing at its upper end a sighting device and connected to the index-hand.

JOSEPH ROPER.

Witnesses:
J. G. CONROY,
JNO. MCNEELY.